US012811540B2

(12) United States Patent
de Fresart et al.

(10) Patent No.: US 12,811,540 B2
(45) Date of Patent: Nov. 24, 2026

(54) PHOTOVOLTAIC MODULE MOUNTING SYSTEM

(71) Applicant: ARRAY TECH, INC., Albuquerque, NM (US)

(72) Inventors: Benjamin C. de Fresart, Chandler, AZ (US); Nathan Schuknecht, Golden, CO (US); Stephen Zimmer, Grand Haven, MI (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 19/449,016

(22) Filed: Jan. 14, 2026

(65) Prior Publication Data

US 2026/0230029 A1 Aug. 6, 2026

Related U.S. Application Data

(60) Provisional application No. 63/748,249, filed on Jan. 22, 2025.

(51) Int. Cl.
*H02S 20/22* (2014.01)

(52) U.S. Cl.
CPC .................................... *H02S 20/22* (2014.12)

(58) Field of Classification Search
None
See application file for complete search history.

(56) References Cited

U.S. PATENT DOCUMENTS 11,962,269 B2 * 4/2024 Creasy .................... B21D 5/06
12,047,032 B2 * 7/2024 Zimmermann ......... H02S 30/10
12,074,559 B2 * 8/2024 Schuknecht .......... F24S 30/425
2015/0200621 A1 * 7/2015 Reed ..................... F24S 25/636
29/525.01
2021/0351738 A1 11/2021 Schuknecht
2023/0009592 A1 * 1/2023 Sable ..................... H02S 20/32
2023/0246589 A1 * 8/2023 Morankar ............... H02S 20/32
248/475.1
2023/0402963 A1 12/2023 Yadlapalli et al.
2024/0039459 A1 * 2/2024 Schuknecht .......... F24S 30/425
2024/0128920 A1 * 4/2024 de Fresart ............... H02S 20/23
2024/0322747 A1 * 9/2024 Delgado-Nanez ...... H02S 20/32
2024/0339960 A1 10/2024 Delgad-Nanez
2024/0372506 A1 11/2024 Delgad-Nanez
2024/0372507 A1 * 11/2024 Schuknecht .......... F24S 30/425
2024/0396490 A1 * 11/2024 Sable ..................... H02S 20/30
2025/0088141 A1 * 3/2025 Mapati .................... H02S 20/32
2025/0233543 A1 * 7/2025 Hansel .................... H02S 20/20
2025/0253800 A1 8/2025 de Fresart et al.
2025/0286500 A1 9/2025 Chen et al.
2025/0309814 A1 10/2025 de Fresart et al.
2026/0039238 A1 2/2026 de Fresart et al.

FOREIGN PATENT DOCUMENTS

WO WO-2023133203 A1 * 7/2023 ............ F24S 30/425
WO WO-2025096457 A1 * 5/2025 ............ H02S 20/30

OTHER PUBLICATIONS

European Patent Office; International Search Report and Written Opinion issued in PCT/US2026/011299 dated May 19, 2026; 13 pages.

* cited by examiner

*Primary Examiner* — Steven M Marsh
(74) *Attorney, Agent, or Firm* — MASCHOFF BRENNAN

(57) ABSTRACT

Embodiments of the present disclosure provide a photovoltaic (PV) module mounting system configured to secure a PV module to a support structure, such as a torque tube.

18 Claims, 13 Drawing Sheets

PHOTOVOLTAIC MODULE MOUNTING SYSTEM

CROSS-REFERENCE TO RELATED APPLICATIONS

This application claims priority under 35 U.S.C. § 119 to U.S. Provisional Application No. 63/748,249, filed Jan. 22, 2025, the entire disclosure of which is incorporated herein by reference.

FIELD OF THE INVENTION

The present disclosure generally relates to photovoltaic module mounting systems used to secure torque tubes to one or more photovoltaic modules.

BACKGROUND

The installation of photovoltaic (PV) modules frequently involves securing a PV module frame to an underlying mounting rail, which is, in turn, mounted on a torque tube. In many designs, this connection relies on nuts and bolts to fasten the PV module frame to the mounting rail. While functional, this bolted connection process is labor-intensive and prone to inconsistencies during installation, leading to potential variability in the quality and durability of the mounting system.

In addition to supporting the weight of PV modules, mounting rails are typically designed to withstand environmental loads such as snow accumulation, seismic forces, wind pressure, and other weather-related stresses. Some PV installations incorporate tracking systems, which enable the PV modules to follow the Sun's movement throughout the day, thereby improving energy production. In some instances, integrating tracking systems with mounting rails and torque tubes introduces additional design and installation challenges—e.g., increased mechanical stresses.

In some instances, consistent rotation of PV modules in tracking systems further adds to the mechanical demands on the mounting rails. To meet these demands, conventional mounting rail designs often incorporate a significant amount of material to ensure structural integrity. However, this increased material usage directly impacts the cost of manufacturing, shipping, and installation. Heavier designs also complicate handling and assembly in the field, further driving up labor costs and reducing overall efficiency.

In addition to the mounting rail connection to a PV module frame, the mounting rail is often secured to the torque tube using one or more mechanisms referred to generally as a torque tube band. Several different mechanisms may be used to secure the mounting rail to the torque tube. For example, a single strap or clamp may be connected to the mounting rail on one side of the torque tube and wrapped around the torque tube to connect with the mounting rail on an opposite side of the torque tube. The single strap or clamp solution is, however, labor intensive and difficult to attach the torque tube consistently and uniformly with the mounting rail. In addition, the single strap solution may use more material and increase cost as compared with other potential solutions. Further, the single strap solution often creates weak points or failure points at locations where the strap is attached to the mounting rail. By creating failure points, additional material may be needed to reinforce these failure points, which further complicates the installation process and leads to an increase in an amount of material used to secure the torque tube to the mounting rail.

To avoid some of the excess material and reinforcement problems with the single strap solutions, some torque tube band solutions connect the mounting rail to the torque tube using two straps, clamps, or arms. In many of these solutions, both straps typically include top portions and bottom portions, where the top portions may be connected to the mounting rail on respective sides of the torque tube and the bottom portions connect to each other via a connecting mechanism underneath the torque tube. However, this solution, much like the single strap solution, includes straps with significant material cost due to difficulties in reinforcing the design. For example, connecting the bottom portions of the straps together applies a large compression force to the bottom portions of the straps. In response, extra material is needed to reinforce the bottom portions. However, by reinforcing the bottom portions with extra material, the connecting mechanism is forced downward, away from the torque tube. As such, even assuming the compression force connecting the bottom portions of the straps remains constant, the moment felt by one or more other portions of the straps increases. Increasing the moment applied to other portions of either strap may lead to deformation or failure which may, again, lead to increasing material costs to reinforce the structure. The difficulty in managing material cost, fatigue, stress, and strain on these straps may lead to inconsistent and expensive results which may ultimately lead to damaged torque tubes and PV modules.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure may address problems experienced in conventional solar panel tracking systems. These problems may include, for example, reducing material used to create mounting rails, attaching PV module frames to the mounting rails, and securing torque tube bands to the torque tube.

Embodiments disclosed herein address these issues by providing a mounting rail design with reduced material, indentations on either side, and protrusions for accurate placement of PV module frames, which may provide several benefits. For example, in some embodiments, the indentations on the end sections of the mounting rail may reduce material usage, improve material strength of the mounting rail, provide improved stress distribution, and decrease manufacturing costs. Additionally, these indentations may enable better compatibility with other components, increase resistance to torsional forces, and provide a more secure grip for handling during installation.

Additionally, in some embodiments, the protrusions on either end section of the mounting rail may facilitate a more secure attachment of PV module frames to the mounting rail, correspondingly reducing the risk of displacement due to environmental factors such as wind or vibration. In some instances, the protrusions may also facilitate easier alignment and installation of PV modules, thereby reducing installation time and labor costs.

In some instances, the combination of these features may lead to a more efficient and cost-effective PV module mounting system. The accurate placement of PV modules facilitated by the protrusions may improve overall system performance and reliability. The lightweight design with strategically placed indentations may enhance structural integrity while maintaining ease of handling during installation. These benefits may collectively contribute to reduced labor costs and improved long-term performance of solar panel installations.

In addition to the benefits of the improved mounting rail design, embodiments of the present disclosure may additionally include benefits associated with an improved torque tube band design. For example, in some embodiments, a lightweight, two-strap mounting structure may be provided that decreases an amount of material used and correspondingly decreases material costs associated with the straps while maintaining a robust structure that is resistant to deformation and failure. In embodiments described herein, individual straps may include a proximal end and a distal end. In some embodiments, the proximal end may include an attaching portion configured to attach the strap to the mounting rail. The distal end of individual straps includes a connecting portion that is configured to connect with another connecting portion of another strap where two straps, in an engaged state, secure the torque tube to the mounting rail. Further, the straps may individually include a cross-sectional shape with a shorter edge and a longer edge. The shorter edge of the strap is configured to interface with the torque tube.

The connecting portions corresponding to each strap may also include a rectangular cross-sectional shape and each is configured to seat a fastener. In some embodiments, the fastener accommodated by the connecting portions of the straps may be a T-bolt. In some embodiments, one of the connecting portions may be configured to seat a head of the T-bolt or a portion of the T-bolt that sits perpendicular to the body of the T-bolt. In some embodiments, the connecting portion configured to seat the head of the T-bolt may include a T-bolt retention seat or recesses machined out of the connecting portion in the shape of the head of the T-bolt. In addition, the connecting portion may include a T-bolt retention tab configured to hold or otherwise lock the head of the T-bolt to the T-bolt retention seat securing the T-bolt's position relative to the connecting portion of the strap. The corresponding connecting portion may include a shorter and longer edge with a rectangular cross section much like the other portions of the strap. The corresponding connecting portion may be configured to seat the opposite portion of the T-bolt to the head of the T-bolt, such that the T-bolt may apply a compression force on the connecting portions of the straps, in an engaged state.

In some embodiments, using a T-bolt retention seat and corresponding retention tab securing the head of the T-bolt may enhance the stability and reliability of the connection between the straps and the torque tube. The T-bolt retention seat may increase an amount of precision in the position and alignment the T-bolt head with respect to the connecting portion of the strap, correspondingly reducing installation time and errors. The retention tab may prevent the T-bolt from rotating or shifting during installation or under dynamic loads, which may improve the overall structural integrity of the mounting system. Additionally, in some instances, this configuration may allow for easier pre-assembly of components, thereby streamlining the installation process on-site. The T-bolt retention seat and tab may also distribute forces more evenly across the connecting portion, potentially reducing stress concentrations and extending the lifespan of the components.

In some embodiments, the cross-sectional shape that includes both a shorter and longer edge may allow the connecting portions to withstand the compression forces applied by the connector without adding more material or increasing a distance of the T-bolt from the bottom or underside of the torque tube. As such, embodiments disclosed herein include straps with less material and less material cost with increased strength particularly at the connecting portions while keeping the connecting portions close to the bottom or underside of the torque tube.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the accompanying drawings in which.

all in accordance with one or more embodiments in the present disclosure.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
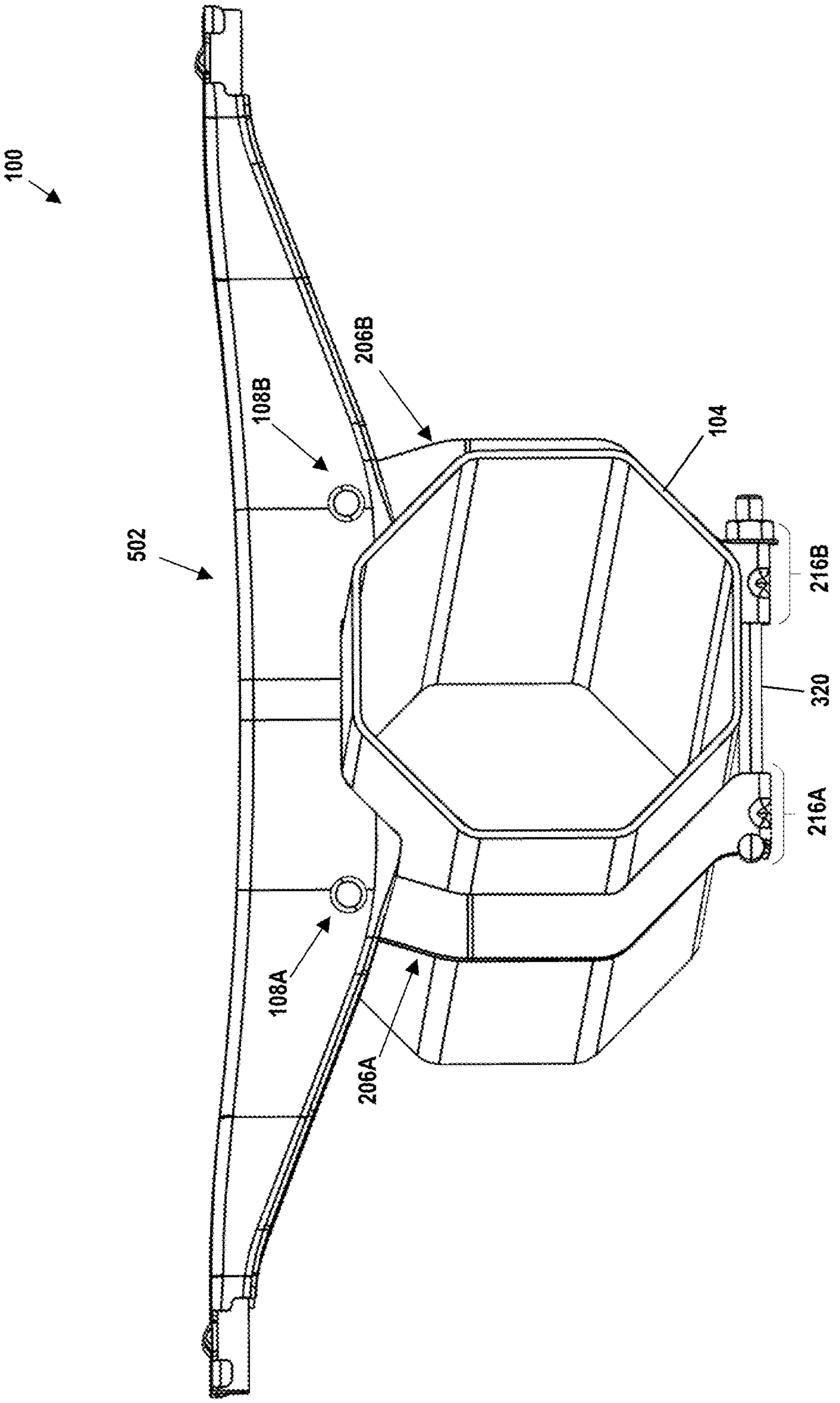
FIG. 1 illustrates an exemplary system for securing a torque tube to a mounting rail.

FIG. 1 illustrates an exemplary PV module mounting system 100 for securing a torque tube 104 to a mounting rail 502 using a torque tube band, which as illustrated in FIG. 1 include straps 206A and 206B. The torque tube 104 includes one or more tubular structures that may be configured to attach to a mounting rail 502 and rotate, such that the rotation of the torque tube 104 may also rotate the mounting rail 502. As shown in FIG. 1, the torque tube 104 includes an octagonal cross section. The torque tube 104 shown in FIG. 1 is provided as an example and is not meant to be limiting. The torque tube 104 may include any number of cross-sectional shapes including octagonal, hexagonal, square, circular, etc. In some embodiments, the size, shape, and position of the torque tube 104 may change depending on the configuration of the solar power system in which the torque tube 104 may be used.

The mounting rail 502 includes two attaching locations 108, a first attaching location 108A and a second attaching location 108B. In some embodiments, the mounting rail 502 may include any number of attaching locations 108. In some embodiments, the attaching locations 108 may refer to locations, points, portions, or sections along the mounting rail 502 where one or more of the straps 206 may attach. For example, the first attaching location 108A may include a section on either side of the mounting rail 502 where one of the straps 206 may attach. In some embodiments, the first attachment location 108A and the second attachment location 108B may indicate a particular location on or section of the mounting rail 502 where different attaching mechanisms may be used to attach the straps 206 (e.g., the first strap 206A and the second strap 206B).

As shown in FIG. 1, one or more attaching mechanisms may be used to attach the first and second straps 206A and 206B to the mounting rail 502 at the first and second attaching locations 108A and 108B including, for example, pins and holes, rivets and keyholes, screws, anchors, etc. Exemplary attaching mechanisms or methods of attaching the straps 206 to the mounting rail 502 may be described and/or illustrated further in the present disclosure, such as, for example, with respect to FIG. 4. As shown in FIG. 1, the two attaching locations 108 attach a first strap 206A and a second strap 206B to the mounting rail 502. The mounting rail 502 may be described and/or illustrated further in the present disclosure such as, for example, with respect to FIGS. 5A-5E.

The first and second straps 206A and 206B (referred to collectively as "the straps 206") may be configured to attach to the mounting rail 502. As shown in FIG. 1, the straps 206 attach to the mounting rail 502 on either side of the torque tube 104. In FIG. 1, the first strap 206A which is visible and therefore exemplary, includes a first end attached to a first side of the mounting rail 502 at attaching location 108A and a second end attached to a second side of the mounting rail 502 at attaching location 108A. In some embodiments, the straps 206 may each include a cross-sectional shape that includes a shorter edge and a longer edge, where the shorter edge is configured to interface with one or more outer edges of the torque tube 104. In FIG. 1, for example, the torque tube 104 includes an octagonal shape and, therefore, the shorter edges of the straps 206 may be shaped and oriented to conform to the octagonal shape of the torque tube 104. This is true of other embodiments as well where the shorter edges of the straps 206 may be shaped and oriented to engage with outer sides or edges of the torque tube 104, whatever the shape.

The first strap 206A may include one or more bends such that a connecting portion 216 may be created. In some embodiments, connecting portion 216 corresponding to the first strap 206A may be connected with a connecting portion 216 corresponding to the second strap 206B using a T-bolt 320. In some embodiments, the connecting portion 216 may include a same or similar cross-sectional shape and may therefore include one or more shorter edges and one or more longer edges. In some embodiments, including the shorter edges of the connecting portion 216 may allow a washer and/or nut of the T-bolt 320 to engage with the shorter edges of the connecting portion 216B. For example, the T-bolt 320 may engage with the connecting portion 216B of the second strap 206B using a washer and nut combination, as shown in FIG. 1. In some embodiments, the washer and nut combination may instead include one or more other structures and methods of attaching the T-bolt 320 to the connecting portion 216B such as, for example, those structures and methods described with respect to FIGS. 3A-3E.

The connecting portion 216A of the first strap 206A may be configured to accommodate the head of the T-bolt 320. In some instances, and as shown in FIG. 1, the connecting portion 216A of the first strap 206A may include a T-bolt retention seat or recesses machined out of the connecting portion 216A in the shape of the head of the T-bolt 320. In addition, the connecting portion 216A may include a T-bolt retention tab configured to hold, snap, or otherwise lock the head of the T-bolt 320 to the T-bolt retention seat or recesses, thereby securing the T-bolt's position relative to the connecting portion 216A of the strap 206A. The connecting portions 216 locking the T-bolt 320 in place may be described further in the present disclosure such as, for example, with respect to FIGS. 3A-3E.

In some embodiments, the longer edge of the connecting portion 216 may increase strength and resistance to deformation of the connecting portions 216 without using additional material to force the T-bolt 320 down and away from the torque tube 104. Exemplary straps 206 may be described and/or illustrated further in the present disclosure, such as, for example, with respect to FIGS. 2A-4. As shown in FIG. 1, in an engaged state, the torque tube 104 is secured to the mounting rail 502 using the first and second straps 206A and 206B connected using the T-bolt 320.

Modifications, additions, or omissions may be made to the system 100 without departing from the scope of the disclosure. For example, another system for securing torque tubes to mounting rails, a torque tube and/or mounting rail may each be a different size, shape, or orientation than what is depicted in FIG. 1. In addition, the number of attaching locations 108 and/or mechanisms designed to attach the straps 206 to the mounting rail 502 may vary. The designations of different elements in the manner described is meant to help explain concepts described herein and is not limiting. Further, the system 100 may include any number of other elements or may be implemented within other systems or contexts than those described.

Figure 2A:
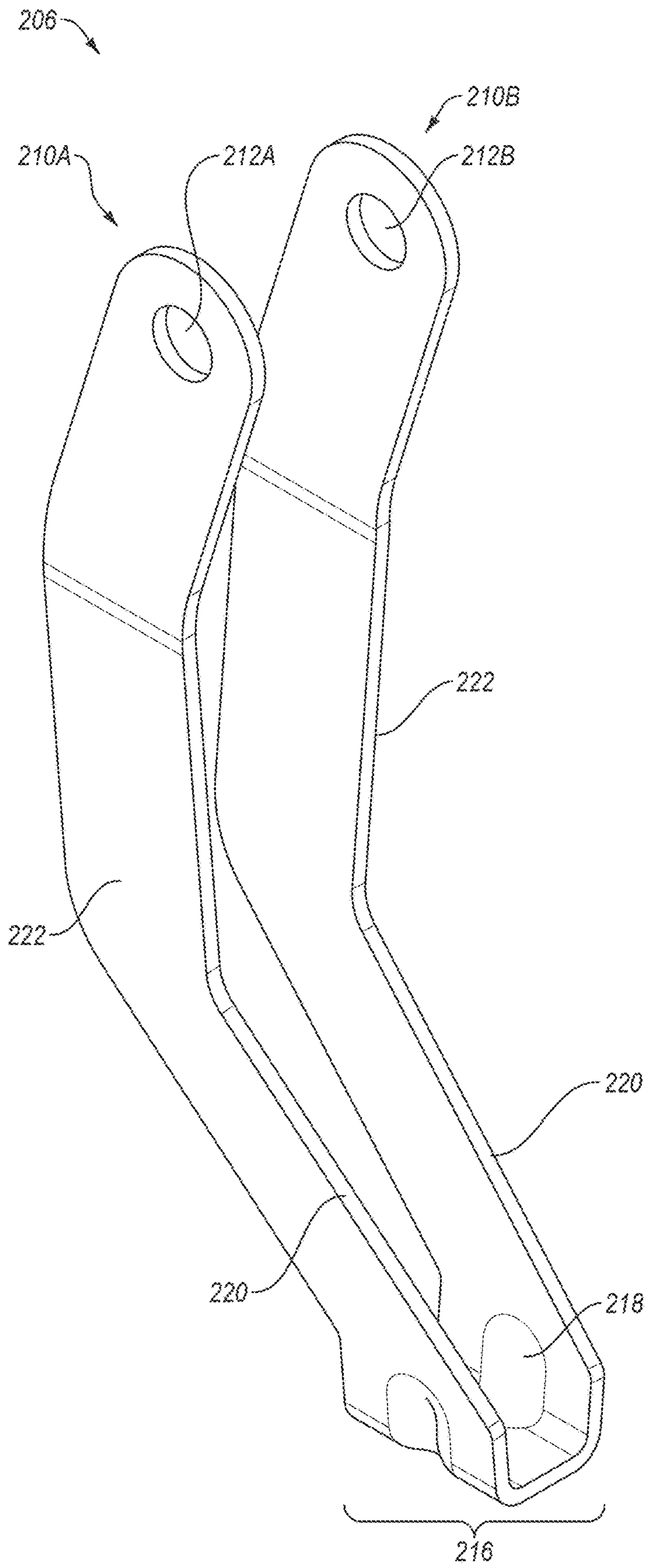
FIGS. 2A-2E illustrate various views of the straps.
Figure 2B:
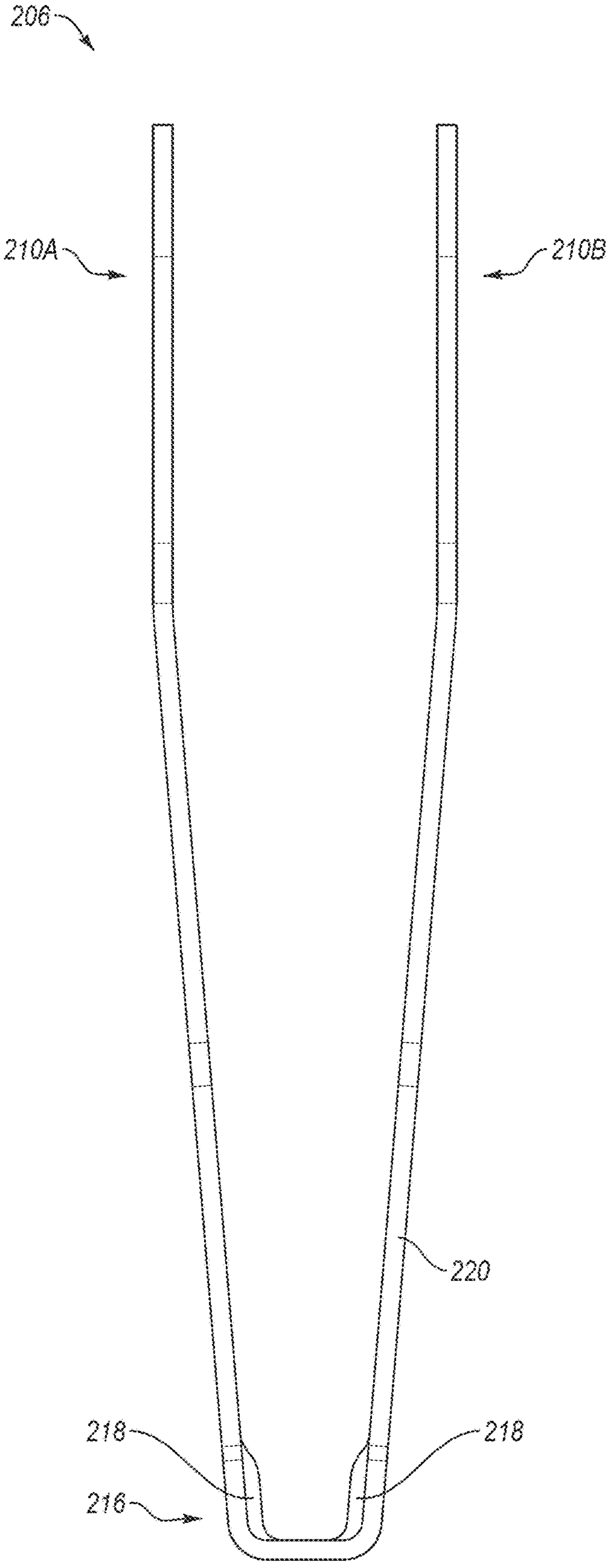
Figure 2C:
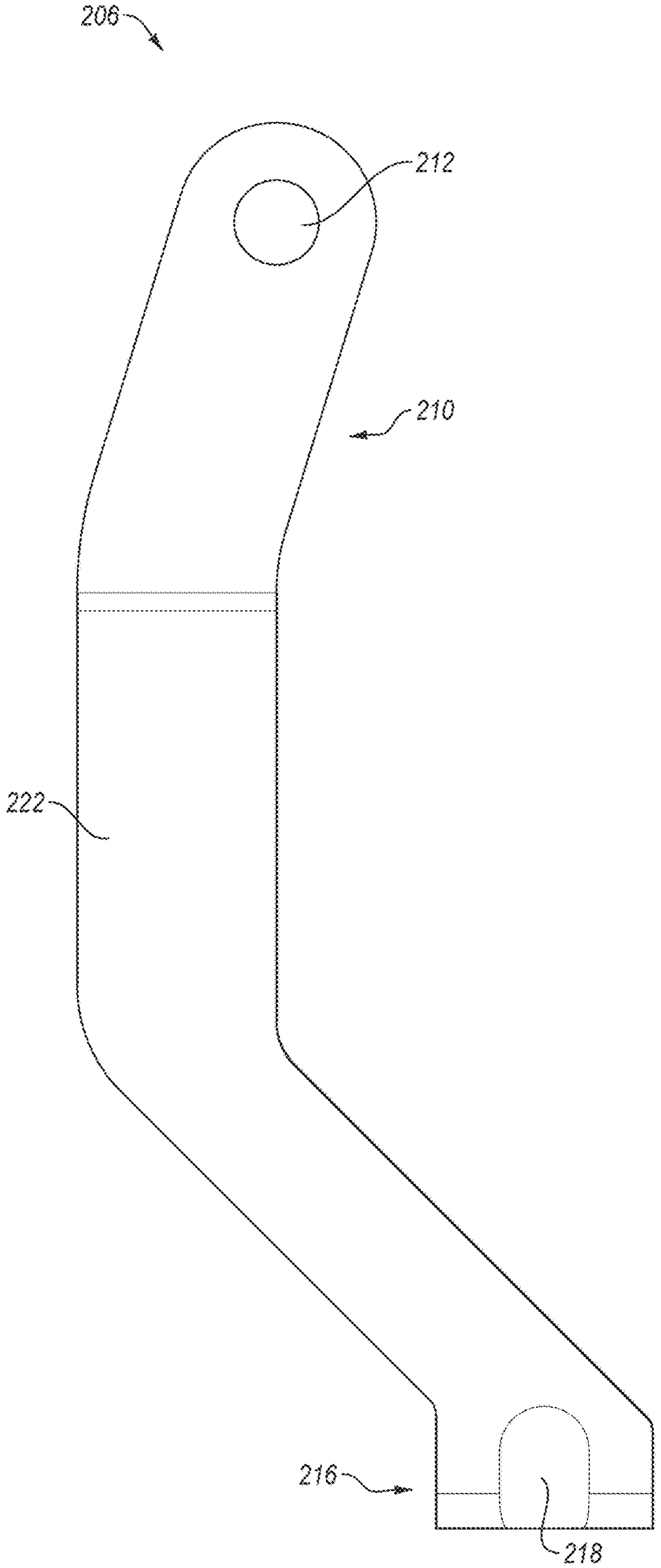
Figure 2E:
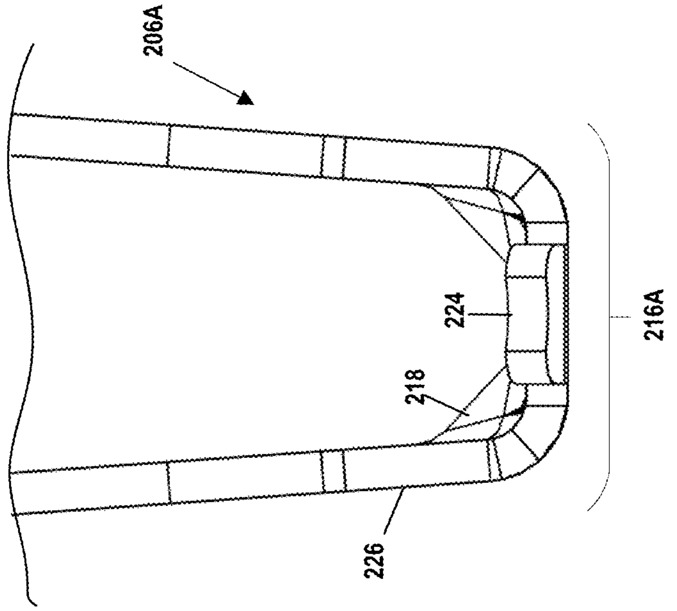
Figure 2D:
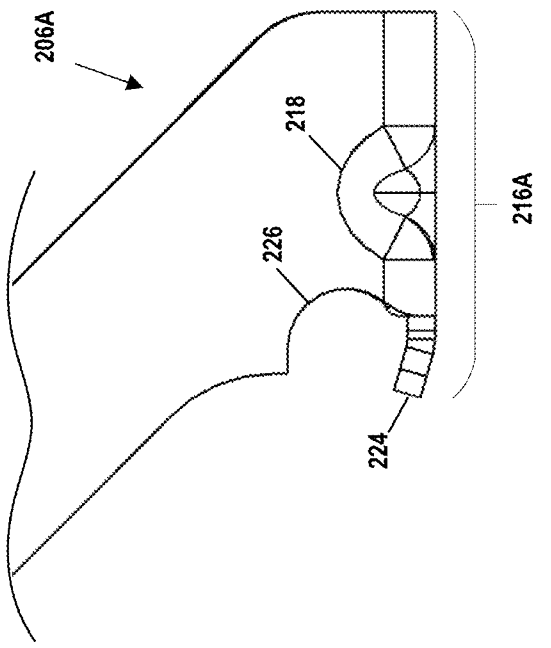

FIGS. 2A-2E illustrate various views of one of the straps 206 (e.g., the first or second straps 206A or 206B) shown in FIG. 1. As referred to throughout the description of FIGS. 2A-2E "the strap 206" refers to one of the straps 206 described and/or illustrated in FIG. 1. Specifically, FIG. 2A illustrates a perspective view of the strap 206. FIG. 2B illustrates a front view of the strap 206. FIG. 2C illustrates a side view of the strap 206. FIG. 2D illustrates a side view of the first connecting portion 216A. FIG. 2E illustrates a front view of the first connection portion 216A.

The strap 206 may be integrally formed. In some embodiments, the strap 206 may be constructed of a single piece of material; for example, the strap 206 may be machined, cut, shaped, etc. from a single sheet of metal (e.g., aluminum, steel, galvanized steel, titanium, etc.) or one or more other plastic or composite materials. In some embodiments, by forming the strap 206 from a single sheet of metal or a single piece of material, the cost of manufacturing the strap 206 may decrease and an amount of material used to manufacture the straps 206 may also decrease as a result.

In some embodiments, the strap 206 may be constructed of several different pieces that may be welded together or otherwise connected or attached to form the strap 206. For example, a portion of the strap 206 that may be configured to attach to the mounting rail 502 may be separate from the remainder of the strap 206 and may be welded or otherwise attached to the remaining portions of the strap 206. As another example, the connecting portion 216 may be formed or constructed separately from the remaining portions of the strap 206 and may be welded or otherwise attached to the remaining portions of the strap 206.

In some embodiments, the strap 206 may include a first end 210A and a second end 210B (collectively the "ends 210"). In some embodiments, the first and second ends 210A and 210B may be configured to attach to the mounting rail 502—e.g., at one or more of the attaching locations 108. In some embodiments, the first end 210A may be configured to attach to a first side of the mounting rail 502 and the second end 210B may be configured to attach to a second side of the mounting rail 502. For example, and as shown in FIG. 2A, the first end 210A defines a first hole 212A and the second end defines a second hole 212B (collectively the "holes 212"). In some embodiments, the holes 212 may be configured to receive one or more pins, rods, dowels, etc. that may be inserted through the first and/or second holes 212A and/or 212B and corresponding holes in the mounting rail 502. In some embodiments, the holes 212 may define keyholes configured to receive one or more rivets attached to the mounting rail 502. The first and second ends 210A and 210B may include or define several different methods or mechanisms with which the strap 206 may be attached to the mounting rail 502. Exemplary methods or mechanisms with which to attach the strap 206 to the mounting rail 502 may be described and/or illustrated further in the present disclosure such as, for example, with respect to FIG. 4.

In some embodiments, the strap 206 may include a cross-sectional shape such that the strap 206 includes a shorter edge 220 and a longer edge 222. In some embodiments, the straps 206 may include a rectangular cross-sectional shape or a substantially rectangular cross-sectional shape where the cross-sectional shape includes a shorter edge and a longer edge. In some embodiments, the cross-sectional shape may be substantially rectangular. For example, the rectangular cross-section may be modified or otherwise reinforced such as, for example, using a bead weld, including additional reinforcing material, or other technique. Additionally or alternatively, the cross-sectional shape may be one or more other shapes such as, for example, circular, ellipsoidal, trapezoidal, polygonal, to name a few.

The shorter edge 220 of the strap 206 may be formed and/or oriented to interface with the torque tube 104. As shown in FIG. 1, the torque tube 104 may include an octagonal cross-section and the strap 206 shown, for example, in FIGS. 1 and 2A-2C, is shaped and oriented such that the shorter edge 222 may interface with an outer edge of the torque tube 104. In some embodiments, the shorter edge 220 may be beveled or rounded, concave, straight, square, or otherwise shaped to interface with or accommodate an outer edge of the torque tube 104. The shorter edge 222 may include a consistent thickness on all sides of the strap 206. Additionally or alternatively, the shorter edge 222 may include variable thicknesses along sides of the strap 206. For example, the shorter edge 222 closer to the first and second ends 210A and 210B may be thicker or thinner than other portions of the strap 206. As an additional example, the shorter edge 222 closer to the connecting portion 216 may be thicker or thinner than other portions of the strap 206.

The longer edge 222 of the strap 206 may represent a width of the strap 206. In some embodiments, the longer edge 222 of the strap 206 may be consistent or the same throughout the strap 206. In some embodiments, the longer edge 222 may be variable throughout the strap. For example, the longer edge 222 corresponding to the connecting portion 216 may be longer than the longer edge 222 corresponding to one or more other portions of the strap 206. For example, a width of the strap 206 corresponding to the connecting portion 216 may be larger than a width corresponding to one or more other portions of the strap 206. In some embodiments, the longer edge 222 may be larger to reinforce one or more portions of the strap 206—for example, the connecting portion 216.

The connecting portion 216 is configured to receive or seat one or more connectors, anchors, bolts, threaded connectors, to name a few examples (e.g., the T-bolt 320). In instances where the strap 206 is formed using a single piece of metal or other material, the connecting portion 216 may be formed by bending or forming the piece of metal thereby creating the connecting portion 216. In FIG. 1, the connecting portion 216 may interface with the T-bolt 320 on one or more of the three sides of the connecting portion 216. In some embodiments, the T-bolt 320 may interface with each of the three sides of the connecting portion 216 thereby seating the fastener within the connecting portion 216. In some embodiments, and as shown in FIG. 1, each of the two straps 206 include connecting portions 216 and are each configured to seat the T-bolt 320 to secure the torque tube—e.g., the torque tube 104. In some embodiments, the connecting portion 216 includes one or more embossed features 218. The embossed feature(s) 218 may be used to center, stabilize, or secure the T-bolt 320 in the strap 206. In some embodiments, the embossed feature(s) 218 may be threaded to assist in securing the T-bolt 320 and help to connect the straps 206 together.

In some embodiments, the connecting portion 216A of the first strap 206A may be configured to seat a head of the T-bolt 320. As shown in FIGS. 2D-2E, the connecting portion 216A of the first strap 206A may include two recesses 226, one recess on either side of the connecting portion 216A. The recesses 226 may serve as a T-bolt retention seat configured to accommodate the head of the T-bolt 320. In some embodiments, the shape of the recesses 226 may be configured to accommodate a shape of the head of the T-bolt 320, whatever the shape. For example, as shown in FIGS. 2D and 2E, the recesses 226 are configured to seat a rounded exterior shape of the head of the T-bolt 320. In some embodiments, the shape of the recesses 226 may be configured to accommodate a rectangular exterior shape, a square exterior shape, a polygonal exterior shape, or other exterior shape of the head of the T-bolt 320.

In some embodiments, the connecting portion 216A of the first strap 206A may include a retention tab 224 configured to secure the head of the T-bolt 320 in place. The retention tab 224 may extend or partially wrap around the head of the T-bolt 320 in its installed state. For example, in this installed state, the head of the T-bolt is seated within a T-bolt retention seat formed by the recesses 226. Continuing this example, the retention tab 224 may at least partially wrap around the head of the T-bolt to maintain its position within the recesses 226.

In some embodiments, the retention tab 224 may exhibit sufficient flexibility to depress to allow the head of the T-bolt 320 to be inserted into the recesses 226. The retention tab 224 may also possess enough rigidity to snap back into place, extending at least partially around the head of the T-bolt 320 to secure it relative to the connecting portion 216A of the first strap 206A. Additionally, the retention tab 224 may extend along the full width of the connecting portion 216A of the first strap 206A. In some instances, as illustrated in FIGS. 2D and 2E, the retention tab 224 may extend only partially along the width of the connecting portion 216A.

In some embodiments, the T-bolt 320 and connecting the two straps 206 may be described and/or illustrated further in the present disclosure, such as, for example, with respect to FIGS. 3A-3E.

FIGS. 3A-3E illustrate an example configuration of the straps 206 including connecting portions 216 capable of accommodating the T-bolt 320 to connect the first and second straps 206 around a torque tube 104. The first and second connecting portions 216A and 216B described with respect to FIGS. 3A-3E is an example of the first and second connecting portions 216A and 216B described further in the present disclosure, such as, for example, with respect to FIGS. 1-2E.

Figure 3A:
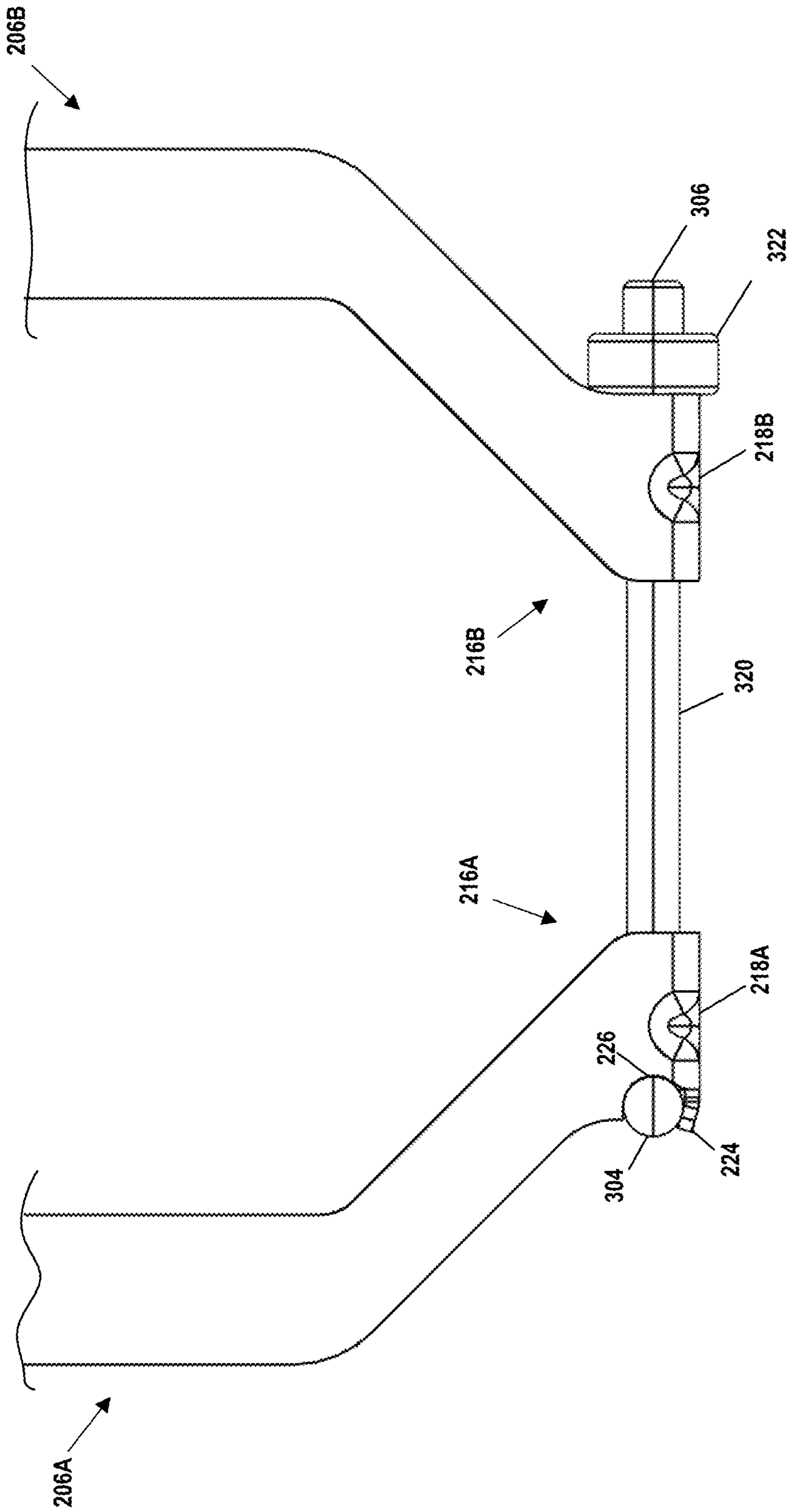
FIGS. 3A-3E illustrate the fastener connecting the first and second straps.
Figure 3B:
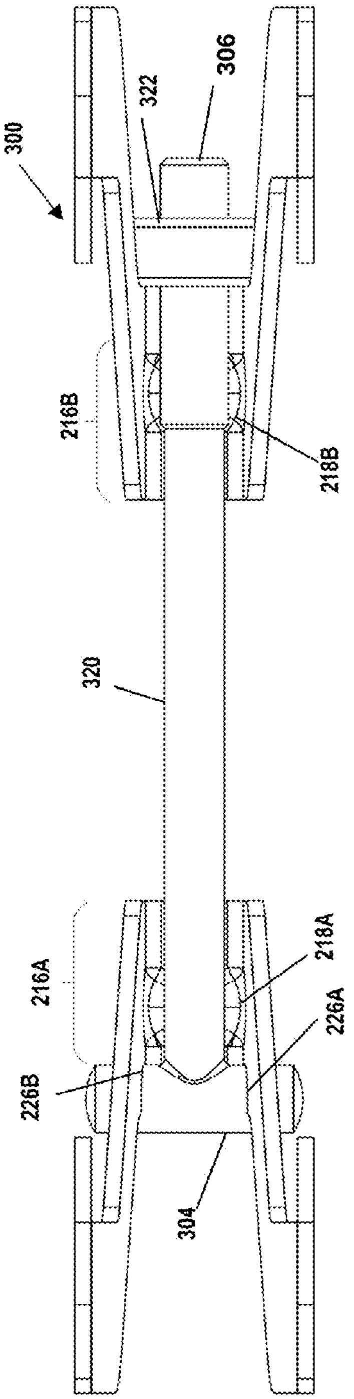
Figure 3D:
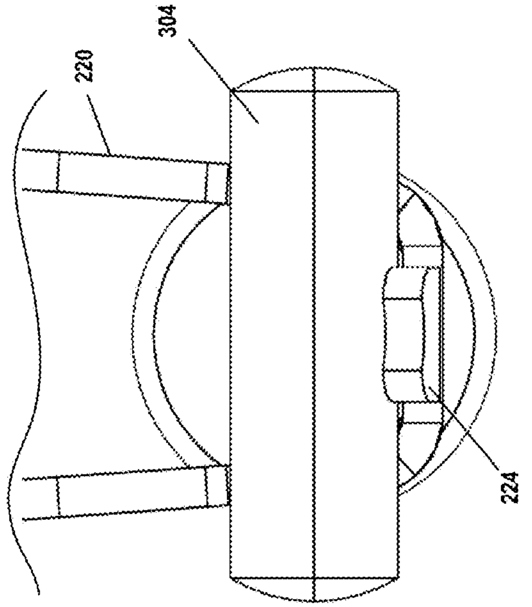
Figure 3C:
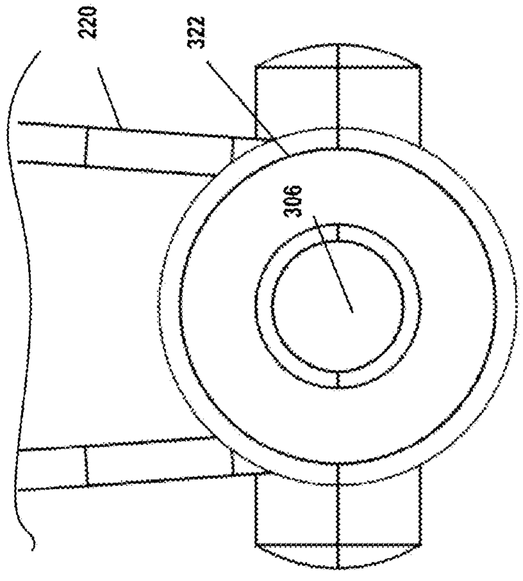
Figure 3E:
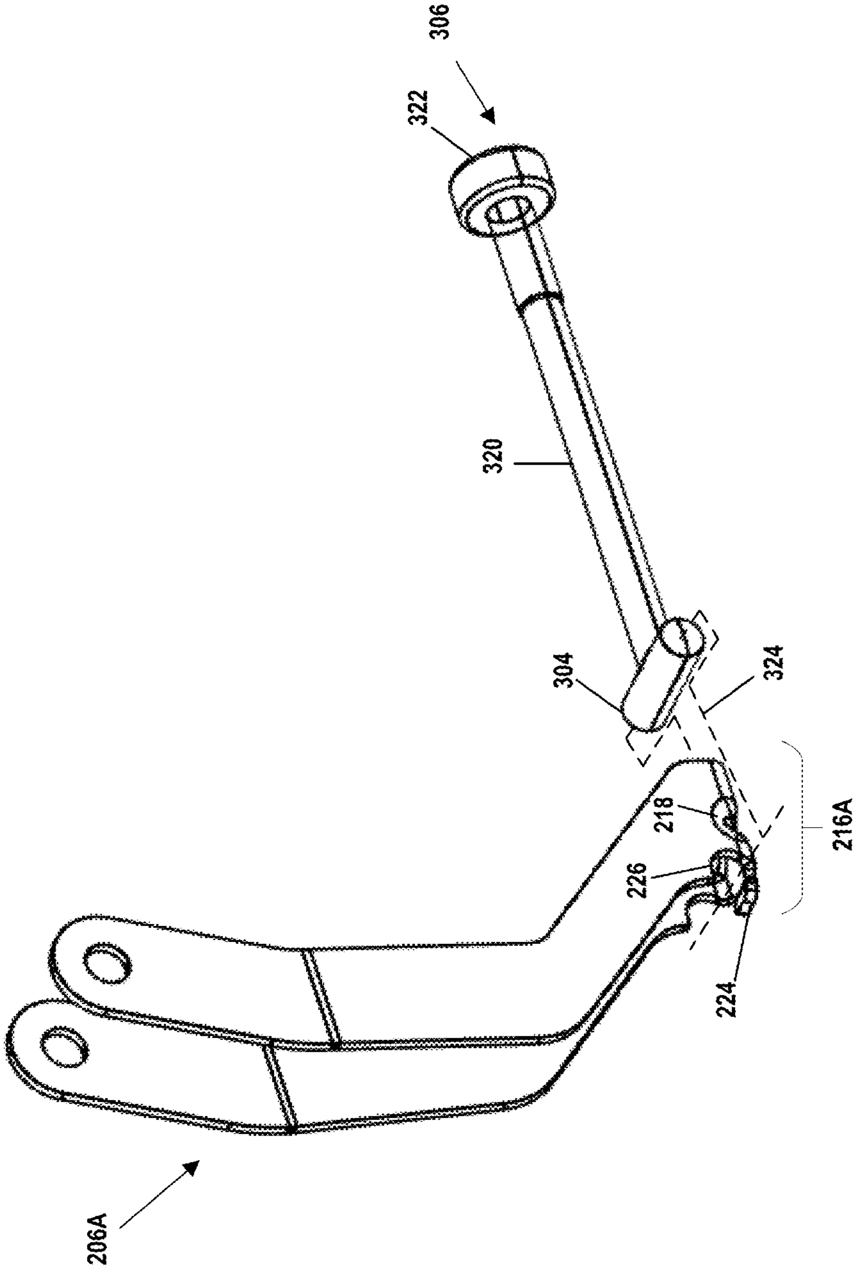

FIG. 3A illustrates a side view of the T-bolt 320 connecting the first and second straps 206A and 206B. FIG. 3B illustrates a top view of the first and second straps 206A and 206B connected using the T-bolt 320. FIG. 3C illustrates a front view of the T-bolt 320 connecting the straps 206. FIG. 3D illustrates a rear view of the T-bolt 320 connecting the straps 206. FIG. 3E illustrates a perspective view of connecting the proximal end 304 of the T-bolt 320 to the first connecting portion 216A.

The T-bolt 320 includes a proximal end 304 and a distal end 306, the proximal end 304 may be shaped to attach to the first connecting portion 216A. In some embodiments, the proximal end 304 of the T-bolt 320 includes a head or a portion that is cylindrically shaped and positioned perpendicular to the remainder of the T-bolt 320, as shown in FIGS. 3A-3E. In some embodiments, the proximal end 304 may include different cross-sectional shapes—e.g., circular, square, rectangular, to name a few. In some embodiments, the proximal end 304 of the T-bolt 320 attaches to the first connecting portion 216A.

Figure 5A:
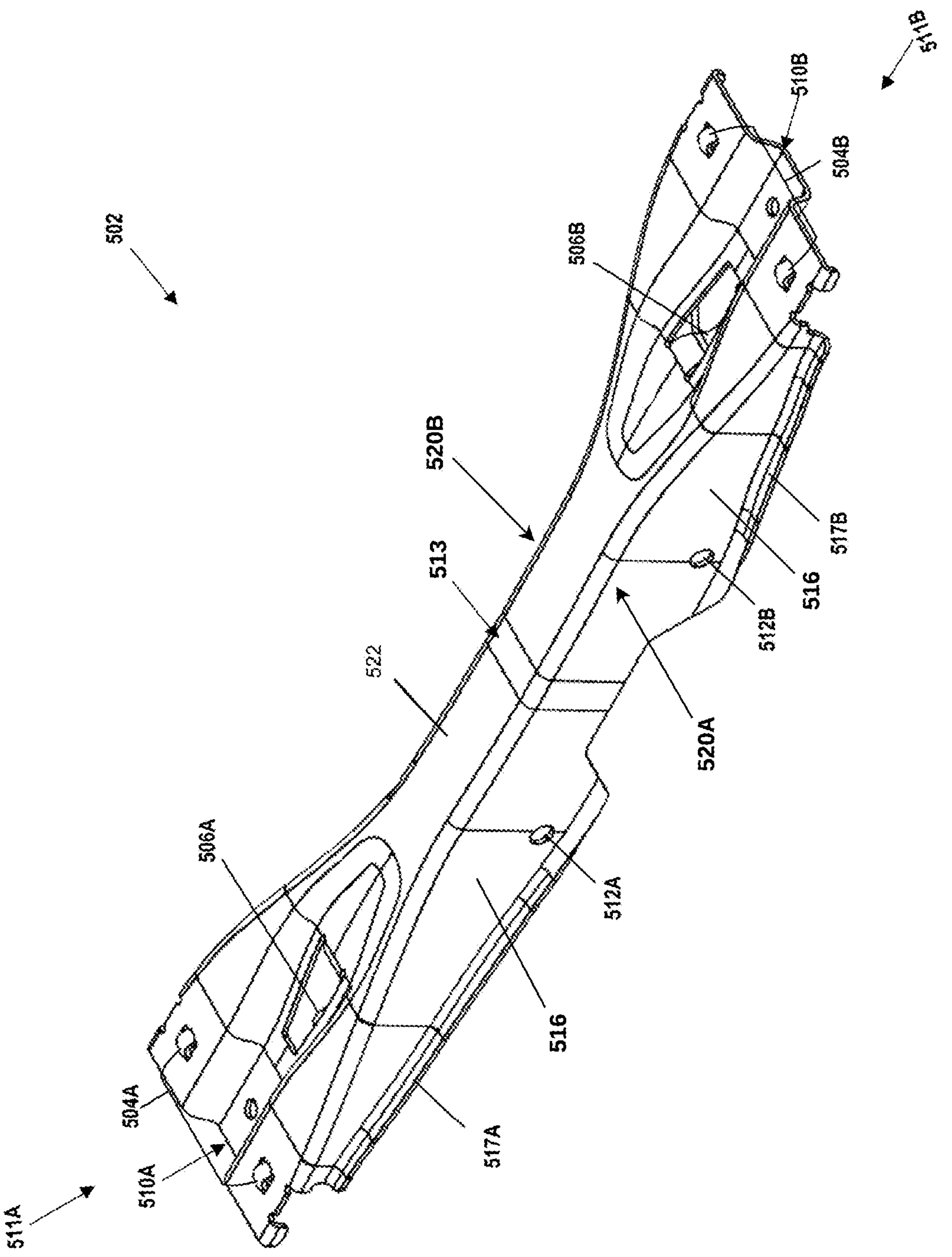
FIGS. 5A-5E illustrate an example configuration of a mounting rail.
Figure 5B:
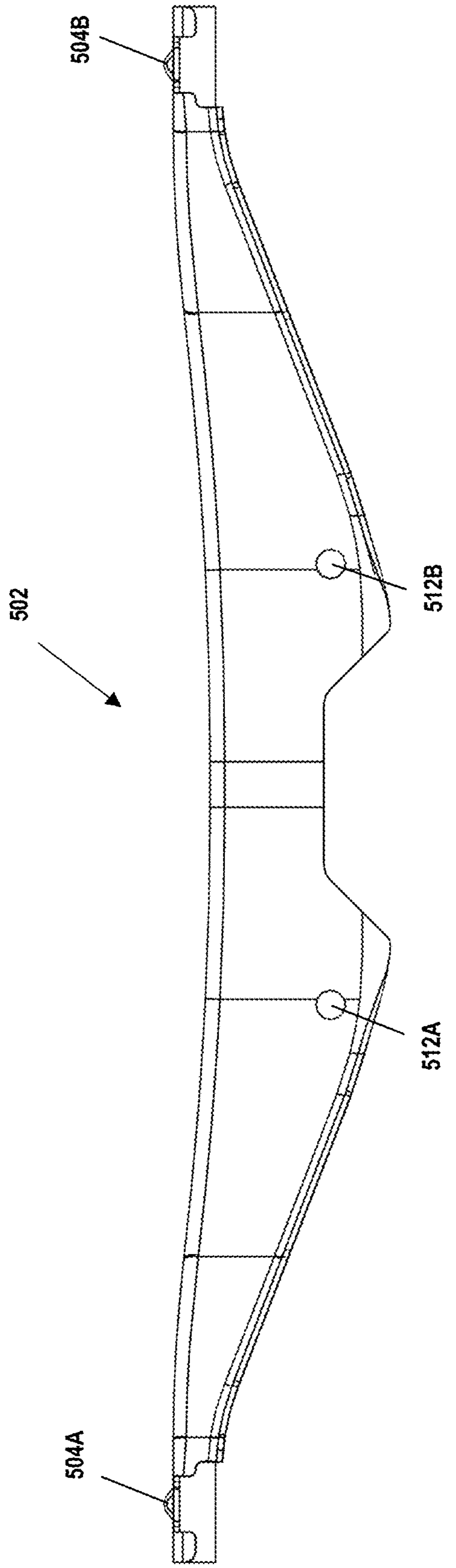

The distal end 306 of the T-bolt 320 may be configured to be seated into the second connecting portion 216B of a second strap 206. For example, as shown in FIG. 5B, the proximal end 304 of the T-bolt 320 is attached to the first connecting portion 216A of the first strap 206A and the distal end 306 of the T-bolt 320 is seated in the second connecting portion 216B of a second strap 206B. In some embodiments, the distal end 306 of the T-bolt 320 may be threaded or include structures to secure the distal end 306 of the T-bolt 320 to the second connecting portion 216B. In some embodiments, the distal end 306 may not include any threads and the distal end 306 may be secured to the second connecting portion 216B using one or more other methods or devices that may tighten the first and second straps 206A and 206B around a torque tube and secure the T-bolt 320 in place. For example, one or more collars with set screws, push nuts, knurled nuts, spring nuts, wedge nuts, etc. As another example, and as shown in FIG. 1, the distal end 306 may include threads and may be secured to the second connecting portion 216B using a nut and washer.

In some embodiments, the connecting portion 216 defines a first recess 226A and a second recess 226B, one on either side of the first connecting portion 216A. In some embodiments, the recesses 226 may be defined, machined, etc. to accommodate the proximal end 304 or head of the T-bolt 320. As shown in FIG. 5A, the recesses 226 are circular, or substantially circular. In some embodiments, the recesses 226 may be defined based on the shape of the proximal end 304 of the T-bolt 320, whatever the shape (for example, the recesses 226 may define a number of shapes including rectangular, polygonal, hexagonal, octagonal, etc.). In some embodiments, the recesses 226 may be configured to receive the proximal end 304 of the T-bolt 320. In some embodiments, the proximal end 304 of the T-bolt 320 may be sufficiently thick to withstand a compression force applied by the fitting 322 and the proximal end 304 of the T-bolt 320 to hold the torque tube 104 in place.

In some embodiments, in an engaged state, the proximal end 304 of the T-bolt 320 may apply a compression force opposite the compression force applied by the fitting 322 to the second connecting portion 216B, thereby allowing the T-bolt 320 to engage the first connecting portion 216A. In some embodiments, the compression force applied by the fitting 322 and, correspondingly, the proximal end 304 of the T-bolt 320 may be varied based on the torque applied to the fitting 322.

In some embodiments, the width or sizes of the longer edge of the first and second connecting portions 216A and 216B may be determined or constructed based on the compression force applied to the first and second connecting portions 216A and 216B. The force being applied, for example, by the fitting 322, and the proximal end 304 of the T-bolt 320. In some embodiments, the cross-sectional shape of the first and second straps 206A and 206B that includes a shorter edge and a longer edge may enable the T-bolt 320 to remain close to the underside of the torque tube 104 while also reinforcing the connecting portions 216 from the compression force applied by the fitting 322, and the proximal end 304 of the T-bolt 320. And, by elongating the longer edges, the first and second straps 206A and 206B may be more resistant to deformation than straps 206 with a smaller width or decreased length of the longer edge.

In some embodiments, as shown in FIG. 3E, the proximal end 304 of the T-bolt 320 may be seated or placed in recesses 226 of the first connecting portion 216A such that the T-bolt 320 is seated in the first connecting portion 216A in the recesses 226 as shown by the dotted lines 324. In some embodiments, to install the proximal end 304 of the T-bolt 320 in the connecting portion 216, the proximal end 304 of the T-bolt 320 may be inserted into the recesses 226 past the retention tab 224. Further, the retention tab 224 may snap or lock into place holding the proximal end 304 of the T-bolt 320 in place relative to the first connecting portion 216A. In these or other embodiments, the retention tab 224 may be described and/or illustrated in the present disclosure such as, for example, with respect to FIGS. 1, 2D and 2E.

In some embodiments, the recesses 226 and the retention tab 224 may provide several advantages over, for example, using the shorter edges of the connecting portion 216A to interface with the proximal end 304 of the T-bolt 320. In some instances, the recesses 226 and the retention tab 224 may enhance the stability and security of the connection of the T-bolt 320 with the first connecting portion 216A. Further, in some instances, the recesses 226 may create a more precise seating area for the T-bolt head, potentially reducing movement and vibration during operation. Additionally, the retention tab 224 may act as a locking mechanism, helping to prevent accidental disengagement of the T-bolt 320. This configuration may allow for easier assembly and disassembly while maintaining a secure connection. The combination of recesses 226 and retention tab 224 may allow for easier assembly and disassembly while maintaining a secure connection and may distribute forces more evenly across the first connecting portion 216A, which may correspondingly increasing the overall strength and durability of the mounting system—e.g., the mounting system 100.

Modifications, additions, or omissions may be made to the T-bolt 320 and/or the straps 206 without departing from the scope of the present disclosure. For example, in some embodiments, the distal end 306 of the T-bolt 320 may be held in place to the second connecting portion 216B using different fitting 322. In some embodiments, the straps 206 may include additional components similar to the components illustrated in FIGS. 2A-2C. For example, sizes, thicknesses, shape, and orientation of the straps 206—e.g., the shorter edge 220, the longer edge 222, the first and second ends 210A and 210B—may vary. In addition, the T-bolt 320 may include one or more different types of fasteners or mechanisms for connecting the first and second straps 206A and 206B.

Figure 4:
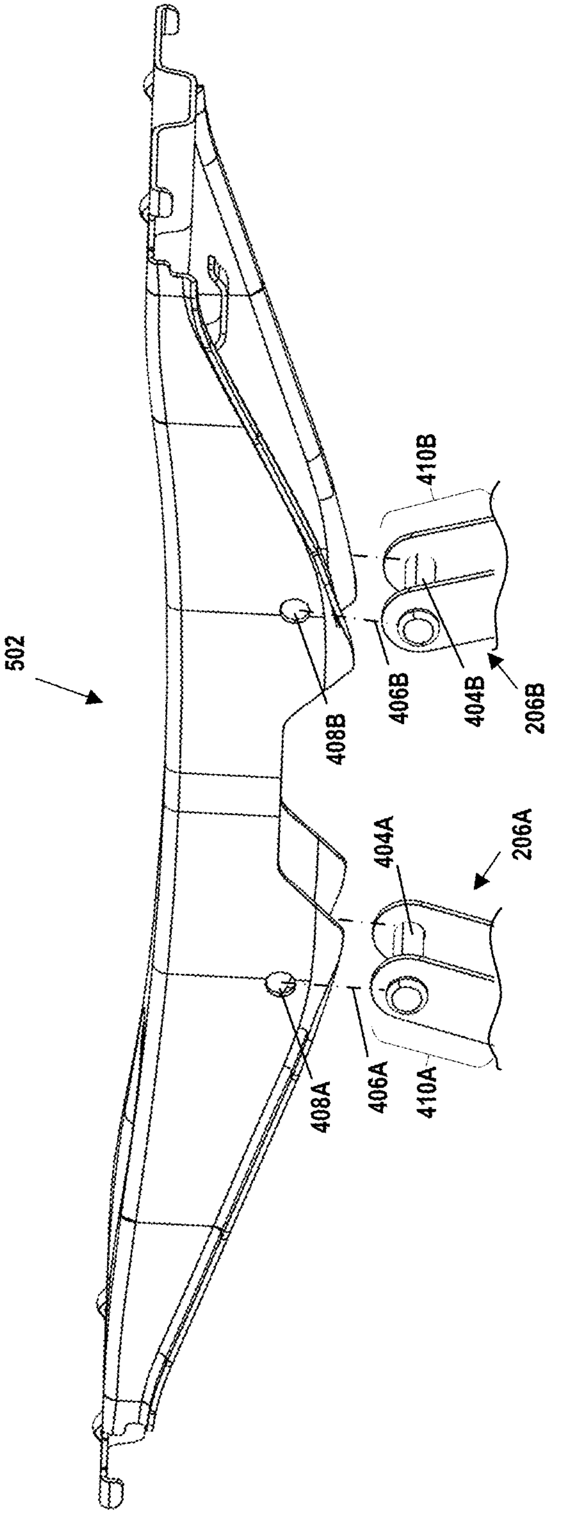
FIG. 4 illustrates exemplary attaching portions or mechanisms for attaching the first and second straps to the mounting rail.

FIG. 4 illustrates exemplary attaching portions or mechanisms for attaching the first and second straps 206A and 206B to the mounting rail 502. Embodiments disclosed herein may illustrate various methods and mechanisms for attaching the first and second straps 206A and 206B. As shown in FIG. 4, the first and second straps 206A and 206B may include corresponding first and second attaching portions 410A and 410B each indicating a portion of the first or second strap 206A or 206B configured to attach to the mounting rail 502. To attach the first and second attaching portions 410A and 410B, the first and second straps 206A and 206B may be raised (e.g., shown by dotted lines 406A and 406B) to corresponding portions or sections of the mounting rail 502—e.g., the first and second attaching locations 108A and 108B described and illustrated in FIG. 1.

In FIG. 4, the first attaching portion 410A may define one or more holes to accommodate a first pin 404A and the second attaching portion 410B may define one or more holes to accommodate a second pin 404B. In addition and correspondingly, the mounting rail 502 may define a first set of holes 408A and a second set of holes 408B individually configured to accommodate the first and second pin 404A and 404B, respectively. In an engaged state, the first attaching portion 410A is attached to the mounting rail 502 at the first set of holes 408A using the first pin 404A. And the second attaching portion 410B is attached to the mounting rail 502 at the second set of holes 408A using the second pin 404A. In some embodiments, the first and second pins 404A and 404B may include one or more pins, rods, dowels, screws, anchors, etc.

Figure 5C:
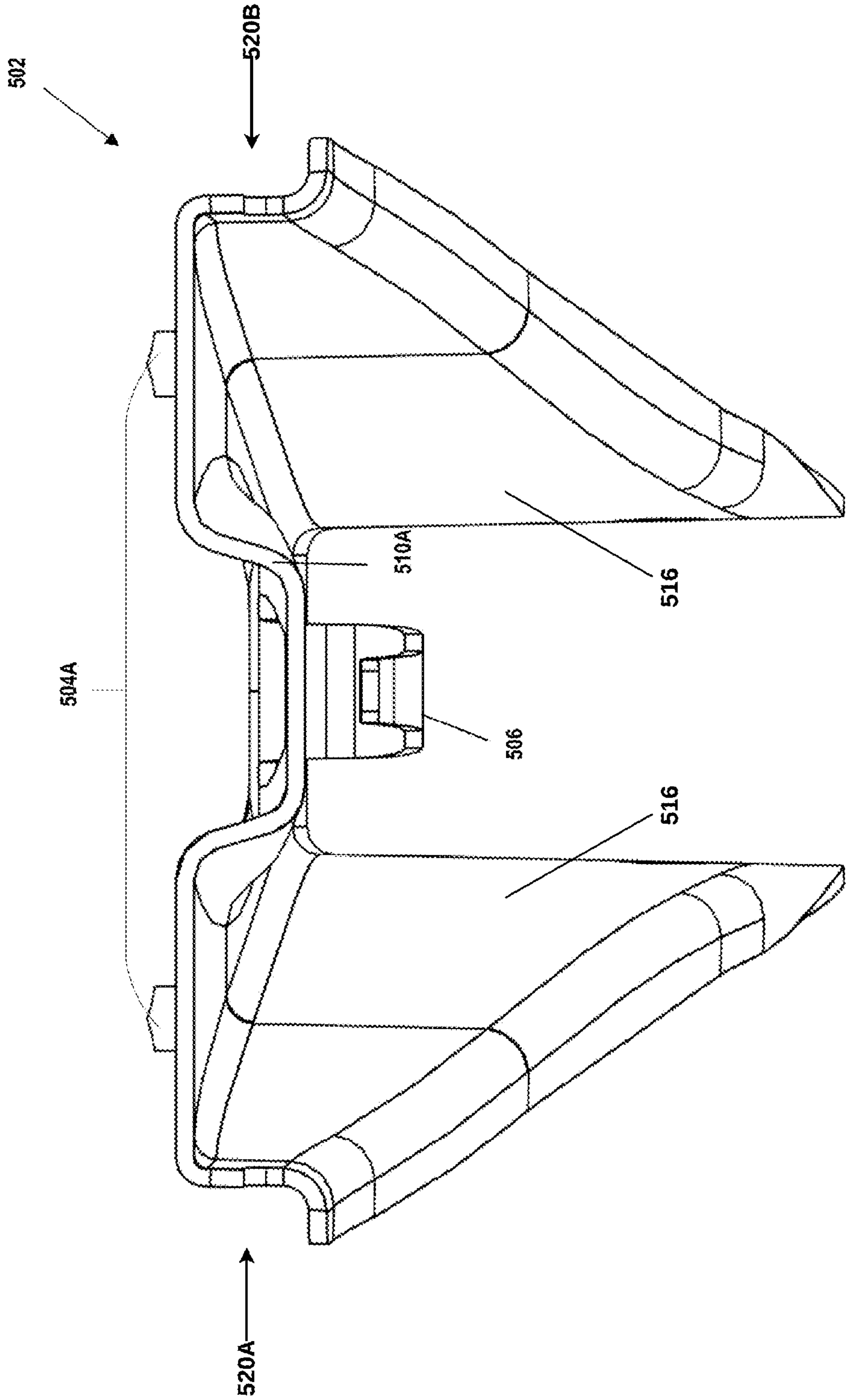
Figure 5E:
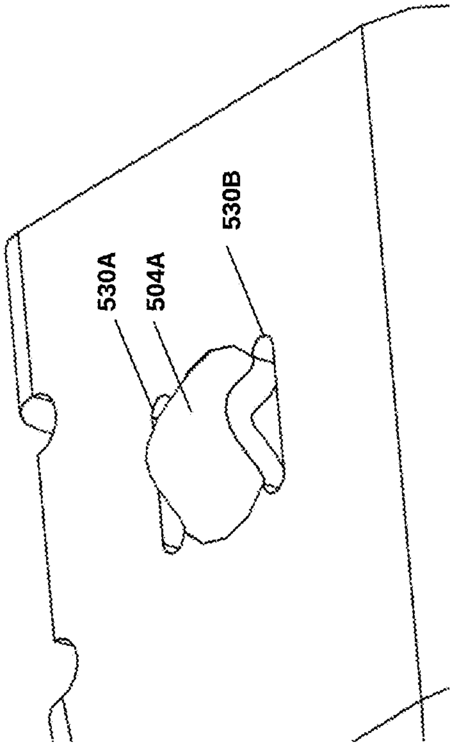
Figure 5D:
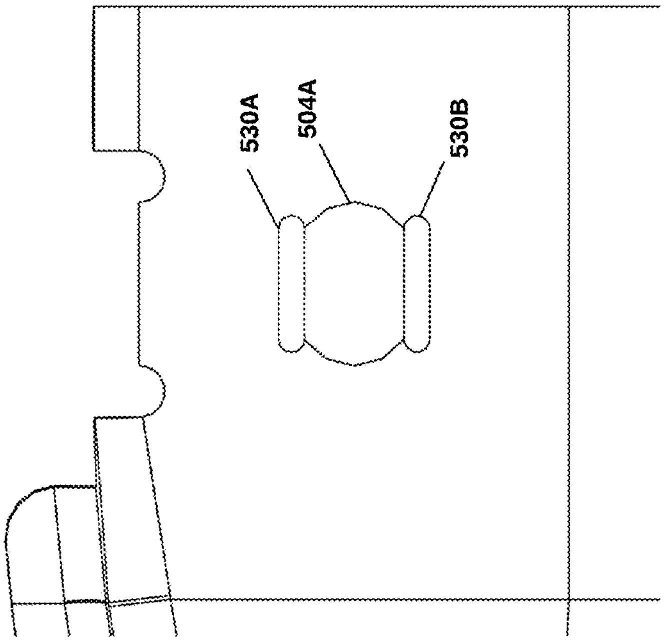

FIGS. 5A-5E illustrate different views of an example embodiment of a mounting rail 502 according to at least one embodiment of the present disclosure in which FIG. 5A shows a perspective view of the mounting rail 502. FIG. 5B is a front view of the mounting rail 502 according to at least one embodiment of the present disclosure, and FIG. 5C is a side view of the mounting rail 502 and FIGS. 5D and 5E are top and perspective views, respectively, showing an example protrusion 504 included in the mounting rail 502 according to at least one embodiment of the present disclosure.

In some embodiments, the mounting rail 502 may include a first side wall 520A having a top edge and a bottom edge, a second side wall 520B having a top edge and a bottom edge, and the connecting structure 522 that couples at least portions of the top edges of the first side wall 520A and the second side wall 520B to form an elongated body described generally as the mounting rail 502. In some embodiments, and as shown, for example, in FIG. 5B, the mounting rail 502 may include a first end section 511A on one end of the mounting rail 502, a second end section 511B on another end of the mounting rail 502 opposite the end corresponding to the first end section 511A. In some embodiments, the mounting rail 502 may further include a first set of holes 512A and a second set of holes 512B.

Further, in some embodiments, the mounting rail 502 includes a central section 513 that is positioned between the first end section 511A and the second end section 511B. In some embodiments, while described using different titles, the first end section 511A, the second end section 511B, and the central section 513 may be integrally formed. While the general locations of the first end section 511A, the second end section 511B, and the central section 513 are illustrated using brackets, these brackets are for illustrative purposes only. The precise boundaries of the first end section 511A, the second end section 511B, and the central section 513 are defined as a range that may extend closer to or farther from the respective ends of the mounting rail 502 than those shown in FIG. 5B.

In some embodiments, the mounting rail 502 may include a bow-tie shape in which the first and second end sections 511A and 511B (herein collectively referred to as "end sections 511") of the mounting rail 502 are wider than a central section 513 of the mounting rail 502. Additionally or alternatively, the end sections 511 of the mounting rail 502 may be shorter than the central section 513 such that the central section 513 has a narrower but taller profile than either of the end sections 511. Because the central section 513 of the mounting rail 502 may experience more stress than either of the end sections 511 when a PV module is mounted on the mounting rail 502, the taller cross-section of the central section 513 may cause the central section 513 to be more rigid in a vertical direction and capable of carrying stress from the weight of the PV module and/or other forces like wind or snow than the shorter and wider end sections 511.

In some embodiments, the first end section 511A of the mounting rail 502 may include one or more protrusions 504A, and the second end section 511B may similarly include one or more protrusions 504B (collectively referred to as "protrusions 504"). The protrusions 504 are formed portions of the mounting rail 502 that may be designed or created as bends, bumps, or other features extending away from a surface of the mounting rail 502.

For example, as shown in FIGS. 5D and 5E, the protrusion 504A may be created by forming a first slot 530A and a second slot 530B (collectively "the slots 530"), each extending through the full thickness of the mounting rail 502. Additionally or alternatively, the first and second slots 530A and 530B may extend only partially through the full thickness of the mounting rail 502.

In some embodiments, the slots 530 may be parallel or substantially parallel to each other, where substantially parallel may be measured from a first longitudinal axis extending through the middle of the first slot 530A as compared with a second longitudinal axis extending though the middle of the second slot 530B. In some instances, the slots 530 may be parallel or substantially parallel with the first side wall 520A and the second side wall 520B. In some embodiments, substantially parallel may indicate that the slots 530 are within 15 degrees of parallel.

In some embodiments, the slots 530 may be oriented parallel or substantially parallel to the longitudinal axis of the mounting rail 502. This orientation may allow for easier formation of the protrusions 504 and may provide improved structural integrity to the mounting rail 502.

In some instances, the widths associated with the slots 530 may be determined to provide sufficient flexibility for the formation of the protrusions 504 while maintaining the overall strength of the mounting rail 502. In some embodiments, lengths associated with the slots 530 may be identified and/or determined to provide sufficient flexibility for the formation of the protrusions 504 while maintaining the overall strength of the mounting rail 502. In some instances, the length and the width of the first and second slots 530A and 530B may be determined based on factors such as the material properties of the mounting rail 502, the desired flexibility of the protrusions 504, and the overall dimensions of the mounting rail 502, to name a few.

In some embodiments, the shape of the slots 530 may be designed to facilitate the formation and function of the protrusions 504. In some embodiments, the slots 530 may have rounded ends and generally straight sides. The rounded ends may help reduce stress concentrations at the ends of the slots 530. The straight sides of the slots 530 may provide a consistent width along the length of the slots 530, which may allow for uniform bending of the protrusions 504. The straight portions of the slots 530 may extend for a majority of the slot length, for example, between about 60% and about 90% of the total slot length.

In some embodiments, the protrusion 504A may be formed between the first and second slots 530A and 530B using one or more dies or punches that deform a tab or material forming the protrusion 504A between the first and second slots 530A and 530B. This deformation may result in the protrusion 504A being pushed upward or downward relative to a surface of the connecting 522.

In some embodiments, the protrusion 504A remains partially connected to the mounting rail 502, ensuring material continuity while forming the protrusion 504A. Stated differently, the material making up the protrusion 504A may remain connected to the connecting structure 522 on both sides where the slots are absent. This connection may provide structural integrity to the protrusion 504A while allowing it to extend away from the top surface of the connecting structure 522. The connected portions on either side of the first and second slots 530A and 530B may act as anchoring points for the protrusion 504A and—in some instances—improving the strength and stability of the protrusion 504A. In some instances, the material continuity between the protrusion 504A and the connecting structure 522 may also facilitate simpler manufacturing processes by allowing the protrusion 504A to be formed through deformation rather than separate attachment.

In some embodiments, the protrusions 504 may be used to locate and attach corresponding holes or features in a PV module frame such that the PV module frame may be properly aligned with the mounting rail 502. In some embodiments, the protrusions 504 may prevent and/or limit translation movement of the PV module frame relative to the mounting rail 502. In some embodiments, the protrusions 504 may additionally be configured to prevent rotational movement between the PV module frame relative to the mounting rail 502.

In some embodiments, the protrusions 504 may align with corresponding features on the PV module frame, ensuring proper spacing of each PV module frame on the same mounting rail 502. For instance, one side of a first PV module frame may engage with one side of the mounting rail 502, using, for example, protrusions 504A and 504B. Similarly, one side of a second PV module frame may align and engage with the other of the protrusions 504A and 504B. As a result, the spacing of the PV module frames on the mounting rail 502 is consistently maintained based on the positioning of the protrusions 504.

In some instances, the protrusions 504 may offer advantages over, for example, one or more extruded holes. For example, protrusions 504 may provide enhanced structural integrity by maintaining material continuity at particular locations in the mounting rail 502, reducing stress concentrations. Further, in some instances, the manufacturing process for protrusions 504 may be more efficient or cost-effective, particularly when decreasing material waste. In addition, protrusions 504 may offer improved alignment capabilities by creating defined engagement points for corresponding components—e.g., corresponding holes in the PV module frames—which may result in more consistent and more precise assembly of the PV module frames on the mounting rail 502.

In some embodiments, each of the end sections 511 of the mounting rail 502 may include corresponding indentations 510. For example, the first end section 511A may include a first indentation 510A and the second end section 511B may include a second indentation 510B.

The indentations 510A and 510B may form U-shaped depressions formed on the mounting rail 502 at the first end section 511A and second end section 511B, respectively. While depicted as U-shaped in the figures in, for example, FIG. 5C, the indentation 510 may be shaped, formed, or machined in different ways that may include different shapes. Each indentation may be positioned between adjacent protrusions 504A, 504B on the respective end sections 511. In some embodiments, the first and second indentations 510A and 510B may extend from the outer edges of the mounting rail 502 toward the central section 513, tapering upward as the first and second indentations 510A and 510B approach the central section 513 or the middle of the mounting rail 502.

In some embodiments, the indentations 510 may proceed further toward the middle of the mounting rail 502 than that shown in FIG. 5A. Additionally or alternatively, the indentations 510 may taper more quickly or further away from the middle of the mounting rail 502 than that shown in FIG. 5A. The depth of the indentations may be greatest at the outer edges of the first and second end sections 511A and 511B, respectively. Further, in some embodiments, the depth of the first and second indentations 510A and 510B may gradually decrease moving inward toward the central section 513 of the mounting rail 502.

In some embodiments, and as shown in FIG. 5A, the first and second indentations 510A and 510B may be shaped to conform to the contours of the mounting rail 502. In some embodiments, the indentations 510 may have a curved or tapered profile that matches the shape of the first and second end sections 511A and 511B of the mounting rail 502. The width of the first and second indentations 510A and 510B may also vary along their length and, in some instances, narrowing as the first and second indentations 510A and 510B approach the central section 513. In some embodiments, the first and second indentations 510A and 510B narrow as the first and second indentations 510A and 510B taper upward toward the central section 513 or the middle of the mounting rail 502. For example, the first and second indentations 510A and 510B may be wider at the outer edges of the first and second end sections 511A and 511B, respectively. Additionally or alternatively, the first and second indentations 510A and 510B may be narrower as the first and second indentations 510A and 510B taper upward toward the central section 513 of the mounting rail 502 than at the outer edges of the first and section end sections 511A and 511B. In some configurations, the edges of the first and second indentations 510A and 510B may be rounded or chamfered to reduce stress concentrations. In some embodiments, the rounded edges along the outer perimeter may be rounded and may slope upward toward the top edges of one or more of the first side wall 520A and the second side wall 520B of the mounting rail 502

In some embodiments, the first and second indentations 510A and 510B may provide natural spacing between the PV module frames that may sit atop the mounting rail 502. For example, the natural spacing may assist in installing PV module frames that may lay on top of the mounting rail 502.

In some embodiments, the first and second indentations 510A and 510B may increase mechanical strength, durability, and design efficiency of the mounting rail 502. For example, the first and second indentations 510A and 510B may act as reinforcing ribs, increasing a moment of inertial corresponding to the mounting rail 502. In some instances, increasing the moment of inertia may increase a resistance to bending and flexing under load of the mounting rail 502. In some instances, the first and second indentations 510A and 510B may help to spread forces more evenly across the mounting rail 502, which may result in decreasing stress concentrations that may otherwise occur on a flat surface. Further, the first and second indentations 510A and 510B may help reduce impacts due to vibrations and impacts which may reduce wear over long periods of time.

In some embodiments, the mounting rail 502 may additionally include a first cable management tab 506A and a second cable management tab 506B. In some embodiments, the cable management tabs 506 may be designed to extend underneath the indentations 510. The cable management tabs 506 may be configured to hang or attach one or more cables underneath the mounting rail 502.

In some embodiments, the mounting rail 502 may include one or more length-wise flanges 517A and/or 517B (collectively referred to as "flanges 517") that extend horizontally from one or more lateral sides 516 of the mounting rail 502. The flanges 517 may include flat and/or curved portions of the lateral sides 516 that extend horizontally from the lateral sides 516 in a width-wise direction. The flanges 517 may facilitate distributing stress experienced by the mounting rail 502 and increase the load that the mounting rail 502 may carry (e.g., increase the maximum weight of the PV module that may be mounted on a PV module mounting system). In these and other embodiments, the flanges 517 may or may not extend around the perimeter of the mounting rail 502. For example, the length-wise flanges 517*b* may extend in the length-wise direction from the ends 511, but the length-wise flanges 517*b* may not be connected to and continuous with respect to the width of the ends 511 of the mounting rail 502.

In some embodiments, having the flanges 517 not extending around the perimeter of the mounting rail 502 may reduce the material stress experienced by the mounting rail 502 caused by the weight of a PV module coupled to the mounting rail 502 and/or caused by external environmental factors such as wind, snow, or other such factors. For example, in some embodiments, the flanges 517 may begin at the first end section 511A and proceed to the bottom surface of the mounting rail 502 that interfaces with the torque tube—e.g., the torque tube 104—and may not extend through the portion of the mounting rail 502 corresponding to the bottom surface of the mounting rail 502 that interfaces with the torque tube. While illustrated as being horizontal, it will be appreciated that the flanges 517*a/b* may be slightly offset from horizontal, such as at 60°, 70°, 80°, 85°, among others.

Modifications, additions, or omissions may be made to the mounting rail 502 without departing from the scope of the disclosure. For example, the designations of different elements in the manner described is meant to help explain concepts described herein and is not limiting. Further, the mounting rail 502 may include any number of other elements or may be implemented within other systems or contexts than those described.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

What is claimed is:

1. A photovoltaic (PV) module mounting system comprising:
a mounting rail including:
a first side wall having a top edge and a bottom edge;
a second side wall having a top edge and a bottom edge; and
a connecting structure that couples at least portions of the top edges of the first and second side walls to form an elongated body having a first end section, a second end section, and a central section that is positioned between the first and second end sections, wherein:
the connecting structure includes a first protrusion positioned toward the first end section that is configured to engage a corresponding feature on a first PV module frame and a second protrusion positioned toward the second end section that is configured to engage a corresponding feature on a second PV module frame; and
the first end section includes a first indentation and the second end section includes a second indentation, and the first and second indentations taper upward toward the central section; and
a torque tube band coupled to the first and second side walls and configured to surround at least a portion of a torque tube.

2. The PV module mounting system of claim 1, wherein each of the first protrusion and the second protrusion includes:
a first slot and a second slot each extending through a full thickness of the connecting structure of the mounting rail; and
material between the first slot and the second slot that protrudes away from a surface of the connecting structure.

3. The PV module mounting system of claim 2, wherein the material that is between the first slot and the second slot is connected to the connecting structure of the mounting rail.

4. The PV module mounting system of claim 2, wherein the first slot is substantially parallel to the second slot.

5. The PV module mounting system of claim 2, wherein each of the first slot and the second slot includes:
two straight sides;
one or more rounded ends connecting the two straight sides on either end of the first slot and the second slot; and
a substantially uniform width along a length of the first slot and the second slot.

6. The PV module mounting system of claim 1, wherein the first and second indentations extend to ends of the connecting structure.

7. The PV module mounting system of claim 1, wherein each of the first protrusion and the second protrusion is shaped and positioned based on corresponding features included on the PV module frame configured to receive the first protrusion and second protrusion, respectively.

8. A photovoltaic (PV) module mounting system comprising:
a mounting rail including:
a first side wall having a top edge and a bottom edge;
a second side wall having a top edge and a bottom edge; and
a connecting structure that couples at least portions of the top edges of the first and second side walls to form an elongated body having a first end section, a second end section, and a central section that is positioned between the first and second end sections, wherein the first end section includes a first indentation and the second end section includes a second indentation, and the first and second indentations taper upward toward the central section; and
a torque tube band coupled to the first and second side walls and configured to surround at least a portion of a torque tube.

9. The PV module mounting system of claim 8, wherein each of the first indentation and the second indentation forms a U-shaped depression extending from an outer edge of the mounting rail toward the central section of the mounting rail.

10. The PV module mounting system of claim 8, wherein each of the first indentation and the second indentation narrows as the first indentation and the second indentation taper upward toward the central section.

11. The PV module mounting system of claim 8, wherein each of the first indentation and the second indentation includes rounded edges along an outer perimeter, the rounded edges sloping upward toward the top edge of the first side wall and the top edge of the second side wall.

12. The PV module mounting system of claim 8, wherein:
the connecting structure includes a first protrusion positioned toward the first end section that is configured to engage a corresponding feature on a first PV module frame and a second protrusion positioned toward the second end section that is configured to engage a corresponding feature on a second PV module frame; and
each of the first protrusion and the second protrusion includes:
a first slot and a second slot each extending through a full thickness of the connecting structure of the mounting rail; and
material between the first slot and the second slot that protrudes away from a surface of the connecting structure.

13. The PV module mounting system of claim 12, wherein the material that is between the first slot and the second slot is connected to the connecting structure of the mounting rail.

14. The PV module mounting system of claim 12, wherein the first slot is substantially parallel to the second slot.

15. A photovoltaic (PV) module mounting system comprising:
a mounting rail; and
a torque tube band comprising:
a first strap having a first end and a second end secured to the mounting rail, the first strap including one or more bends forming a first connecting portion between the first and second ends, wherein the first connecting portion includes a retention seat configured to receive a proximal end of a fastener; and
a second strap having a first end and a second end, the second strap including one or more bends forming a second connecting portion between the first and second ends, wherein the first and second ends are configured to be secured to the mounting rail and the second connecting portion is configured to receive a distal end of the fastener, wherein the fastener couples the first connecting portion to the second connecting portion, such that in a coupled configuration, the first and second straps are configured to secure the mounting rail to a torque tube.

16. The PV module mounting system of claim 15, wherein the retention seat includes one or more recesses defined in the first connecting portion of the first strap.

17. The PV module mounting system of claim 16, wherein the fastener includes a T-bolt and the proximal end of the fastener includes a head of the T-bolt.

18. The PV module mounting system of claim 15, wherein the first connecting portion includes a retention tab configured to secure a position of the proximal end of the fastener relative to the first connecting portion of the first strap.

* * * * *